United States Patent
Rico Alvarino et al.

(10) Patent No.: US 10,524,108 B2
(45) Date of Patent: Dec. 31, 2019

(54) D2D COMMUNICATION FOR EMTC DESIGN CONSIDERATIONS

(71) Applicant: QUALCOMM Incorporated, San Diego, CA (US)

(72) Inventors: Alberto Rico Alvarino, San Diego, CA (US); Madhavan Srinivasan Vajapeyam, San Diego, CA (US); Wanshi Chen, San Diego, CA (US); Shimman Arvind Patel, San Diego, CA (US); Hao Xu, San Diego, CA (US); Juan Montojo, San Diego, CA (US); Yongbin Wei, La Jolla, CA (US)

(73) Assignee: QUALOMM Incorporated, San Diego, CA (US)

(*) Notice: Subject to any disclaimer, the term of this patent is extended or adjusted under 35 U.S.C. 154(b) by 194 days.

(21) Appl. No.: 15/260,997

(22) Filed: Sep. 9, 2016

(65) Prior Publication Data

US 2017/0111780 A1 Apr. 20, 2017

Related U.S. Application Data

(60) Provisional application No. 62/243,635, filed on Oct. 19, 2015.

(51) Int. Cl.
*H04W 24/04* (2009.01)
*H04W 48/16* (2009.01)
(Continued)

(52) U.S. Cl.
CPC ............ *H04W 8/005* (2013.01); *H04L 45/28* (2013.01); *H04W 4/70* (2018.02); *H04W 24/08* (2013.01);
(Continued)

(58) Field of Classification Search
None
See application file for complete search history.

(56) References Cited

U.S. PATENT DOCUMENTS

| 2003/0144003 A1 | 7/2003 | Ranta et al. |
| 2012/0115518 A1* | 5/2012 | Zeira ............... H04W 8/005 |
| | | 455/500 |

(Continued)

FOREIGN PATENT DOCUMENTS

| EP | 2983411 A1 | 2/2016 |
| WO | WO-2014109142 A1 | 7/2014 |
| WO | WO-2015026200 A1 | 2/2015 |

OTHER PUBLICATIONS

Partial International Search Report—PCT/US2016/051247—ISA/EPO—dated Nov. 30, 2016.

(Continued)

*Primary Examiner* — Duc T Duong
(74) *Attorney, Agent, or Firm* — Patterson & Sheridan, LLP

(57) ABSTRACT

Certain aspects of the present disclosure provide methods for wireless communications by a base station and a user equipment in a network. An exemplary method generally includes performing a discovery procedure to identify one or more devices through which the UE may indirectly communicate with a base station in the network and deciding based on one or more criteria whether to communicate with the base station directly or to communicate with the base station indirectly via a device identified by the discovery procedure. According to certain aspects, when a UE is in communication with a network indirectly, the network might page the UE directly, indirectly, or both.

27 Claims, 9 Drawing Sheets

(51) Int. Cl.

| | | |
|---|---|---|
| *H04W 72/02* | (2009.01) | |
| *H04W 8/00* | (2009.01) | |
| *H04W 4/70* | (2018.01) | |
| *H04W 40/12* | (2009.01) | |
| *H04L 12/703* | (2013.01) | |
| *H04W 40/24* | (2009.01) | |
| *H04W 48/12* | (2009.01) | |
| *H04W 40/22* | (2009.01) | |
| *H04W 24/08* | (2009.01) | |
| *H04W 56/00* | (2009.01) | |
| *H04W 72/08* | (2009.01) | |
| *H04W 74/08* | (2009.01) | |
| *H04W 36/30* | (2009.01) | |
| *H04W 36/00* | (2009.01) | |
| *H04W 40/36* | (2009.01) | |
| *H04W 84/04* | (2009.01) | |
| *H04W 88/02* | (2009.01) | |
| *H04W 88/08* | (2009.01) | |

(52) U.S. Cl.
CPC ........... *H04W 40/12* (2013.01); *H04W 40/22* (2013.01); *H04W 40/246* (2013.01); *H04W 48/12* (2013.01); *H04W 56/001* (2013.01); *H04W 72/085* (2013.01); *H04W 74/0833* (2013.01); *H04W 36/0077* (2013.01); *H04W 36/30* (2013.01); *H04W 40/36* (2013.01); *H04W 48/16* (2013.01); *H04W 84/042* (2013.01); *H04W 88/02* (2013.01); *H04W 88/08* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/20* (2018.01); *Y02D 70/21* (2018.01); *Y02D 70/24* (2018.01); *Y02D 70/26* (2018.01); *Y02D 70/34* (2018.01); *Y02D 70/39* (2018.01)

(56) References Cited

U.S. PATENT DOCUMENTS

| | | | |
|---|---|---|---|
| 2012/0213109 A1 | 8/2012 | Xu et al. | |
| 2012/0320763 A1 | 12/2012 | Hong et al. | |
| 2013/0034082 A1* | 2/2013 | Etemad | H04W 36/14 |
| | | | 370/331 |
| 2013/0201936 A1 | 8/2013 | Chen et al. | |
| 2013/0322388 A1 | 12/2013 | Ahn et al. | |
| 2014/0146721 A1 | 5/2014 | Yarvis et al. | |
| 2014/0198663 A1 | 7/2014 | Xu et al. | |
| 2014/0295827 A1 | 10/2014 | Tesanovic et al. | |
| 2015/0237555 A1 | 8/2015 | Kashiwase | |
| 2015/0271856 A1* | 9/2015 | Tong | H04W 16/26 |
| | | | 455/426.1 |
| 2016/0088668 A1* | 3/2016 | Kim | H04W 48/16 |
| | | | 370/315 |
| 2016/0119739 A1* | 4/2016 | Hampel | H04W 4/70 |
| | | | 370/315 |
| 2016/0212682 A1 | 7/2016 | Chung et al. | |
| 2016/0286564 A1* | 9/2016 | Berggren | H04W 76/14 |
| 2016/0338095 A1* | 11/2016 | Faurie | H04W 28/0278 |
| 2017/0164187 A1* | 6/2017 | Lu | H04W 8/24 |
| 2017/0244468 A1* | 8/2017 | Zhao | H04B 7/14 |
| 2017/0289957 A1* | 10/2017 | Zhang | H04W 68/02 |
| 2017/0311355 A1* | 10/2017 | Yi | H04W 4/70 |
| 2018/0139682 A1* | 5/2018 | Xu | H04W 88/04 |
| 2018/0255505 A1* | 9/2018 | Thyagarajan | H04W 8/005 |

OTHER PUBLICATIONS

International Search Report and Written Opinion—PCT/US2016/051247—ISA/EPO—dated Feb. 27, 2017.

* cited by examiner

US 10,524,108 B2

D2D COMMUNICATION FOR EMTC DESIGN CONSIDERATIONS

CLAIM OF PRIORITY UNDER 35 U.S.C. § 119

This application claims benefit of U.S. Provisional Patent Application Ser. No. 62/243,635, filed Oct. 19, 2015, which is herein incorporated by reference in its entirety.

I. FIELD

Certain aspects of the present disclosure generally relate to wireless communications and, more particularly, to device-to-device (D2D) communication considerations for wearable machine type communication (MTC) devices.

II. BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

Certain aspects of the present disclosure provide a method for wireless communications by a user equipment in a network. The method generally includes performing a discovery procedure to identify one or more devices through which the UE may indirectly communicate with a base station in the network and deciding based on one or more criteria whether to communicate with the base station directly or to communicate with the base station indirectly via a device identified by the discovery procedure.

Certain aspects of the present disclosure provide an apparatus for wireless communications by a user equipment in a network. The apparatus generally includes at least one processor configured to perform a discovery procedure to identify one or more devices through which the UE may indirectly communicate with a base station in the network and decide based on one or more criteria whether to communicate with the base station directly or to communicate with the base station indirectly via a device identified by the discovery procedure. The apparatus also generally includes a memory coupled with the at least one processor.

Certain aspects of the present disclosure provide an apparatus for wireless communications by a user equipment in a network. The apparatus generally includes means for performing a discovery procedure to identify one or more devices through which the UE may indirectly communicate with a base station in the network and means for deciding based on one or more criteria whether to communicate with the base station directly or to communicate with the base station indirectly via a device identified by the discovery procedure.

Certain aspects of the present disclosure provide a non-transitory computer-readable medium for wireless communications by a user equipment in a network. The non-transitory computer-readable medium generally includes instructions for performing a discovery procedure to identify one or more devices through which the UE may indirectly communicate with a base station in the network and deciding based on one or more criteria whether to communicate with the base station directly or to communicate with the base station indirectly via a device identified by the discovery procedure.

Certain aspects of the present disclosure provide a method for wireless communications by an apparatus in a network. The method generally includes determining one or more parameters for a discovery procedure, to allow discovery of the apparatus by a user equipment (UE) of a first type capable of communicating with a base station in the network via at least one narrowband region of larger system bandwidth transmitting discovery signals in accordance with the determined one or more parameters.

Certain aspects of the present disclosure provide an apparatus for wireless communications in a network. The apparatus generally includes at least one processor configured to determine one or more parameters for a discovery procedure, to allow discovery of the apparatus by a user equipment (UE) of a first type capable of communicating with a base station in the network via at least one narrowband region of larger system bandwidth and transmit discovery signals in accordance with the determined one or more parameters. The apparatus also generally includes a memory coupled with the at least one processor.

Certain aspects of the present disclosure provide an apparatus for wireless communications in a network. The apparatus generally includes means for determining one or more parameters for a discovery procedure, to allow discovery of the apparatus by a user equipment (UE) of a first type capable of communicating with a base station in the network via at least one narrowband region of larger system bandwidth and means for transmitting discovery signals in accordance with the determined one or more parameters.

Certain aspects of the present disclosure provide a non-transitory computer-readable medium for wireless communications by an apparatus in a network. The non-transitory computer-readable medium generally includes instructions for determining one or more parameters for a discovery procedure, to allow discovery of the apparatus by a user equipment (UE) of a first type capable of communicating with a base station in the network via at least one narrowband region of larger system bandwidth transmitting discovery signals in accordance with the determined one or more parameters.

Certain aspects of the present disclosure provide a method for wireless communications by a base station in a network. The method generally includes identifying a user equipment (UE) of a first type capable of communicating with the base station via at least one narrowband region of larger system bandwidth, identifying at least one intermediate device through which the UE may indirectly communicate with the base station, and deciding whether to page the UE directly, indirectly via the intermediate device, or both directly and indirectly via the intermediate device.

Certain aspects of the present disclosure provide an apparatus for wireless communications by a base station. The apparatus generally includes at least one processor configured to identify a user equipment (UE) of a first type capable of communicating with the base station via at least one narrowband region of larger system bandwidth, identify at least one intermediate device through which the UE may indirectly communicate with the base station, and decide whether to page the UE directly, indirectly via the intermediate device, or both directly and indirectly via the intermediate device. The apparatus also generally includes a memory coupled with the at least one processor.

Certain aspects of the present disclosure provide an apparatus for wireless communications by a base station in a network. The apparatus generally includes means for identifying a user equipment (UE) of a first type capable of communicating with the base station via at least one narrowband region of larger system bandwidth, means for identifying at least one intermediate device through which the UE may indirectly communicate with the base station, and means for deciding whether to page the UE directly, indirectly via the intermediate device, or both directly and indirectly via the intermediate device.

Certain aspects of the present disclosure provide a non-transitory computer-readable medium for wireless communications by a base station. The non-transitory computer-readable medium generally includes instructions for identifying a user equipment (UE) of a first type capable of communicating with the base station via at least one narrowband region of larger system bandwidth, identifying at least one intermediate device through which the UE may indirectly communicate with the base station, and deciding whether to page the UE directly, indirectly via the intermediate device, or both directly and indirectly via the intermediate device.

Numerous other aspects are provided including methods, apparatus, systems, computer program products, and processing systems.

DETAILED DESCRIPTION

Aspects of the present disclosure provide various techniques for improving communication for machine type communication (MTC) devices capable of communicating with a network directly (e.g., via a base station) or indirectly (e.g., via an intermediate device using device-to-device (D2D) communication). More specifically, aspects of the present disclosure provide techniques to improve low-power discovery, transitioning between direct and relay link communication, and paging of MTC devices.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
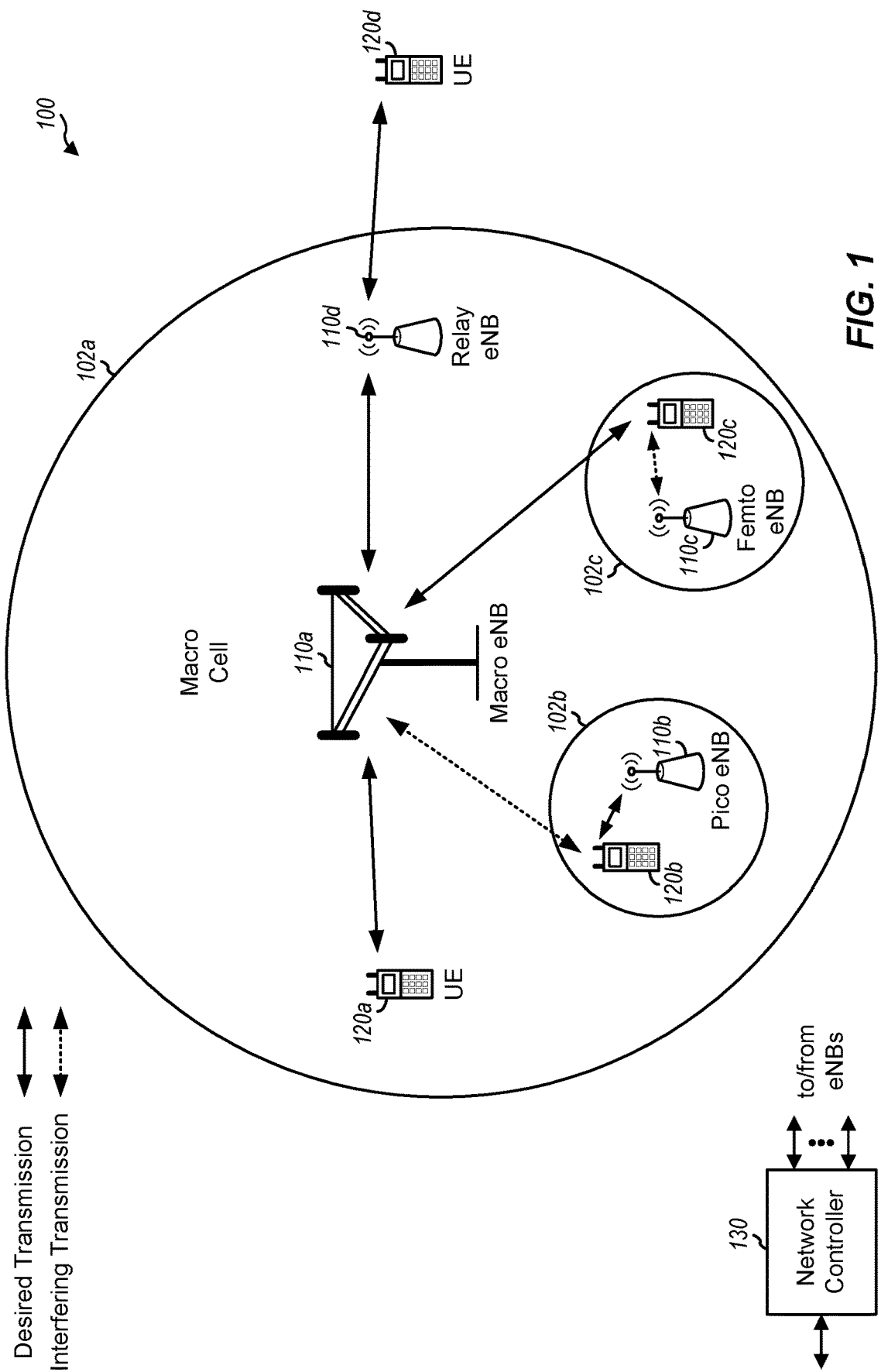
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the low complexity UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

According to certain aspects, narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
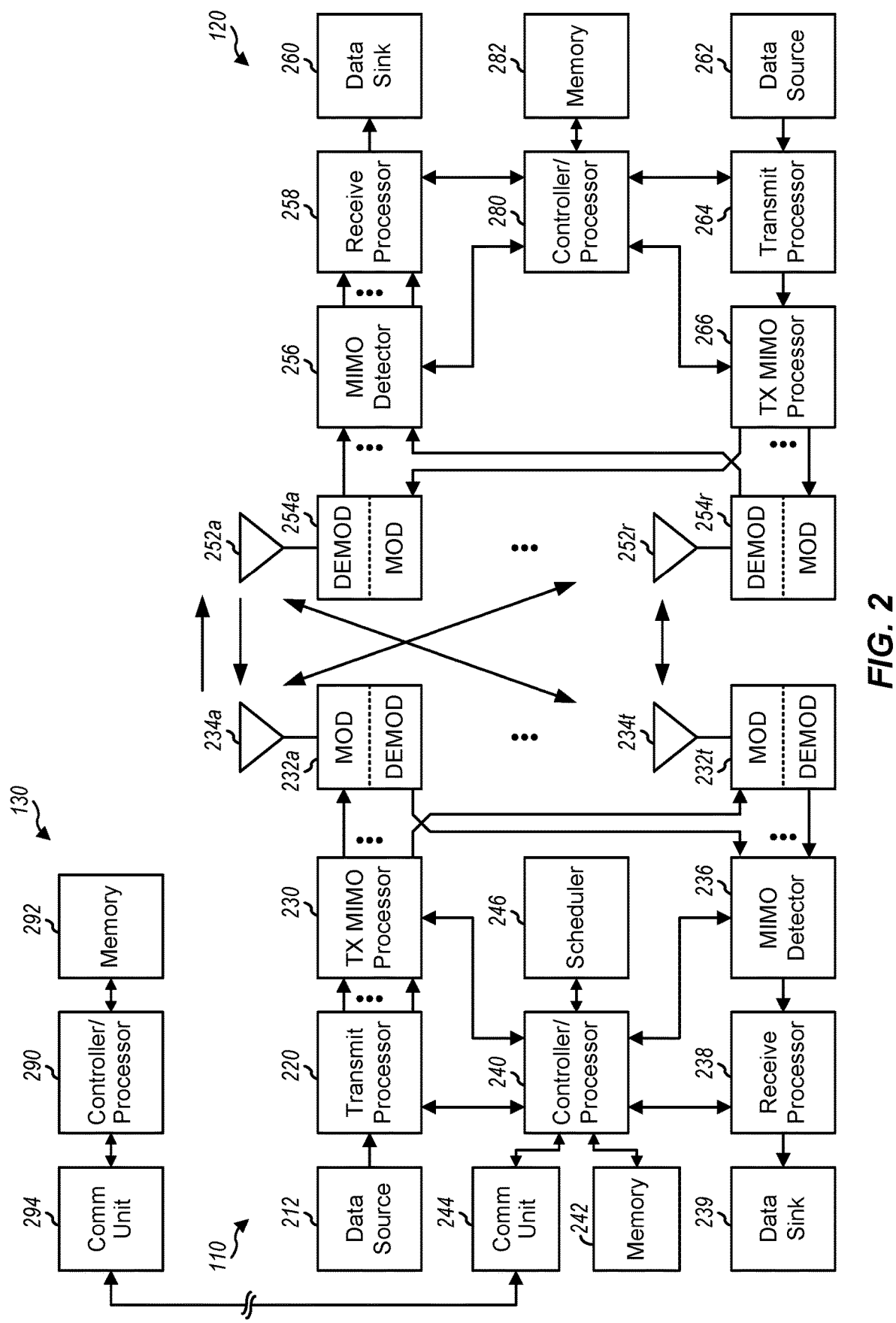
FIG. 2 shows a block diagram conceptually illustrating an example of a base station in communication with a user equipment (UE) in a wireless communications network, in accordance with certain aspects of the present disclosure.
Figure 6:
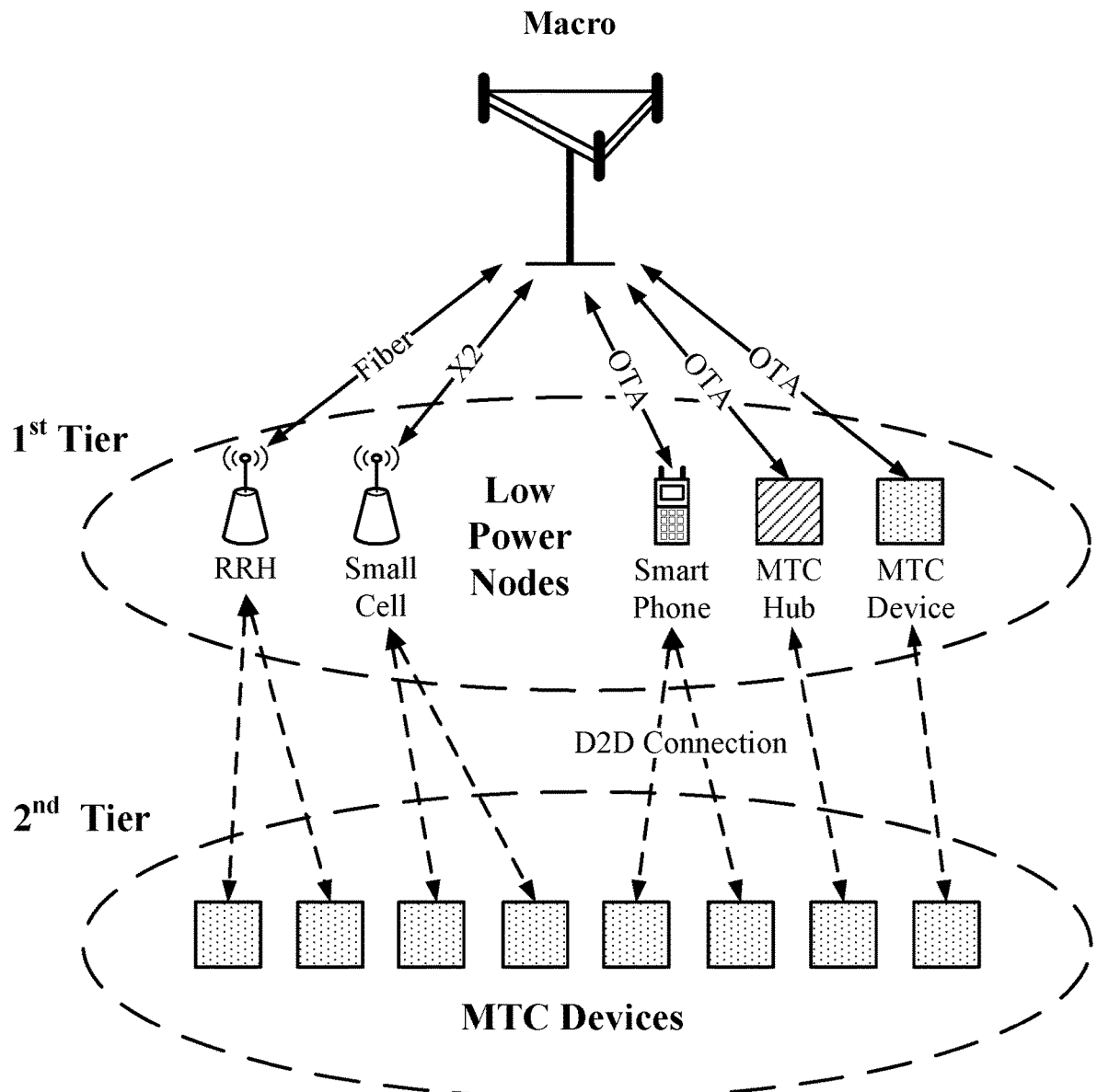
FIG. 6 illustrate an example wireless communication environment, in accordance with certain aspects of the present disclosure.

FIG. 2 shows a block diagram of a design of base station/eNB 110 and UE 120, which may be one of the base stations/eNBs and one of the UEs in FIG. 1. Additionally, in some cases, the UE 120 may be an intermediate device (e.g., a $1^{st}$ Tier device as illustrated in FIG. 6) that facilitates communication between the network (e.g., eNB 110) and a machine type communication (MTC) device (e.g., another UE 120, for example, a $2^{nd}$ Tier device as illustrated in FIG. 6). Base station 110 may be equipped with T antennas 234a through 234t, and UE 120 may be equipped with R antennas 252a through 252r, where in general T 1 and R 1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

The Controllers/processors 240 and 280 may direct the operation at base station 110 and UE 120, respectively. For example, controller/processor 280 and/or other processors and modules at UE 120, may perform or direct operations 700 shown in FIG. 7 and/or operations 800 shown in FIG. 8. Additionally, for example, controller/processor 240 and/or other processors and modules at eNB 110 may perform or direct operations 900 shown in FIG. 9. Memories 242 and 282 may store data and program codes for base station 110 and UE 120, respectively, for example, instructions/programs codes for carrying out the processes illustrated in the functional blocks of FIGS. 7, 8, and 9. A scheduler 246 may schedule UEs for data transmission on the downlink and/or uplink.

Figure 3:
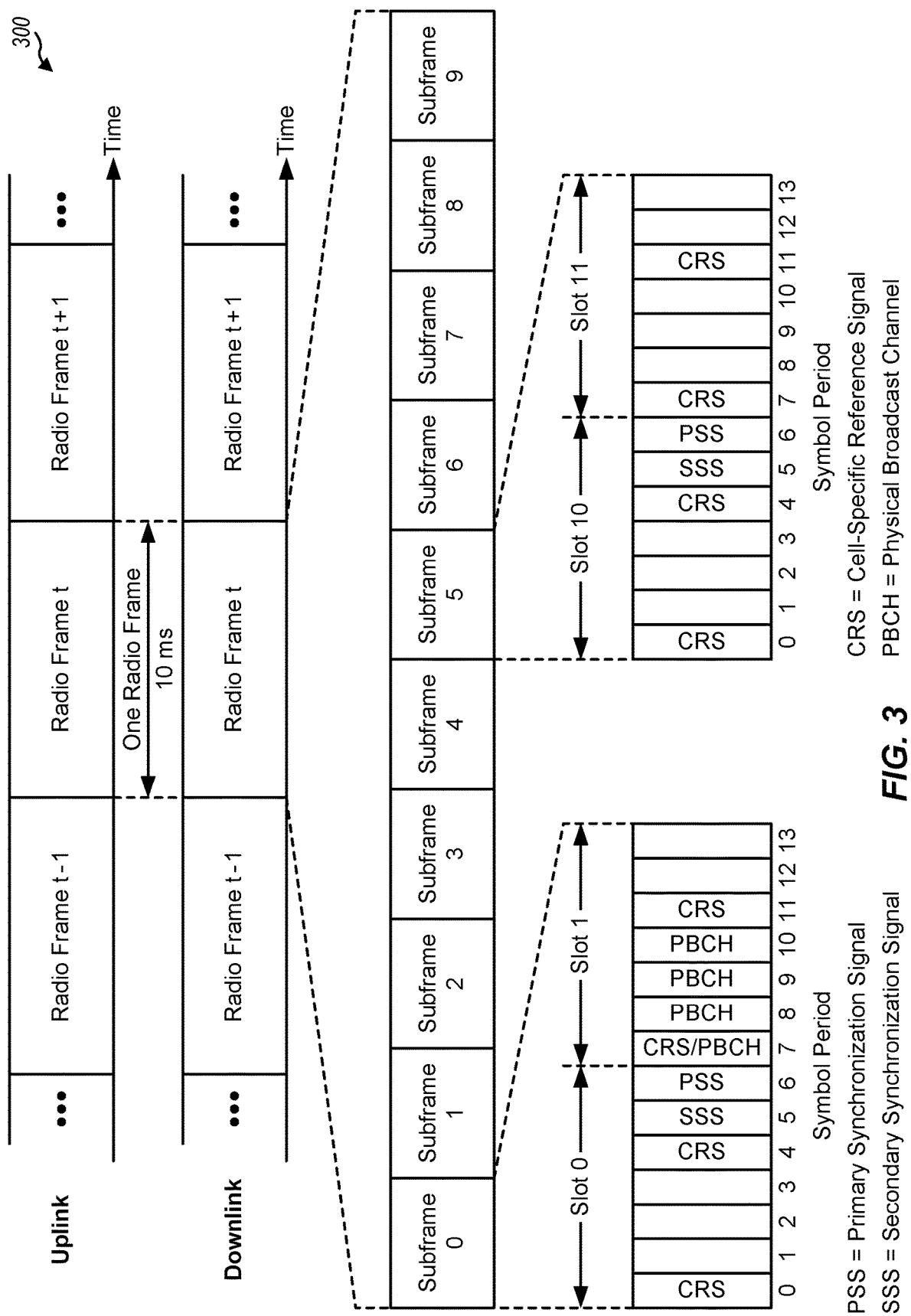
FIG. 3 shows an exemplary frame structure for FDD in LTE.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells. Measurements for non-serving neighbor cells may be made based on a different schedule than for serving cells and the UE may need to tune away from the serving cell to measure non-serving cells when the UE is in connected mode.

To facilitate channel quality measurements, n eNB may transmit a cell specific reference signal (CRS) on specific subframes. For example, an eNB may transmit CRS over subframes 0 and 5 for a given frame. A narrowband UE may receive this signal and measure the average power of the received signal, or RSRP. The narrowband UE may also calculate a Receive Signal Strength Indicator (RSSI) based on the total received signal power from all sources. A RSRQ may be also be calculated based on the RSRP and RSSI.

To facilitate measurements, an eNB may provide a measurement configuration to UEs in its coverage area. The measurement configuration may define event triggers for measurement reporting and each event trigger may have associated parameters. When the UE detects a configured measurement event, it may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter can be used to define how long a measurement event must persist before the UE sends its measurement report. In this way, the UE can signal changes in its radio conditions to the network.

Figure 4:
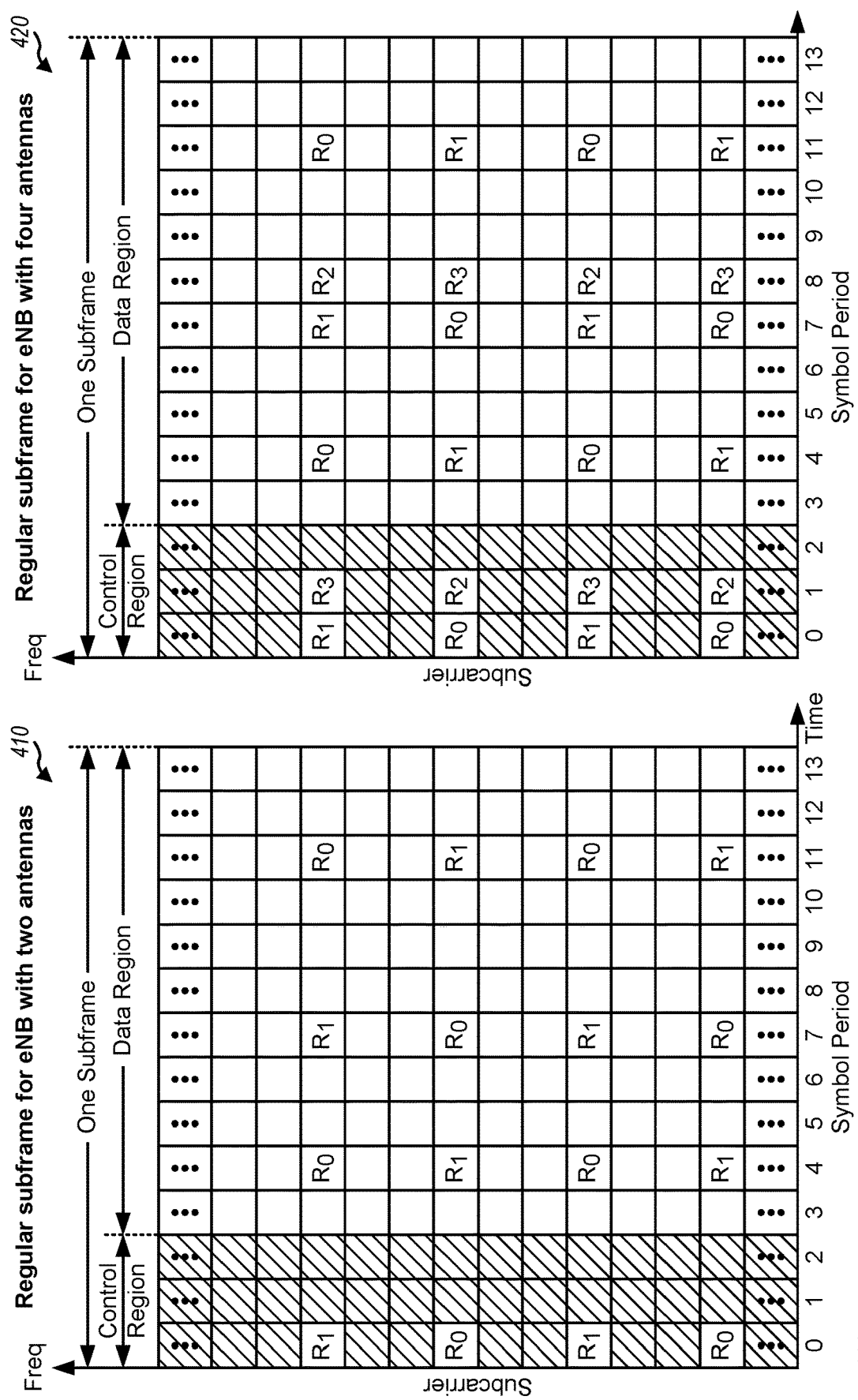
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

The focus of traditional LTE design is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

Thus, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 1000 bits for a transport block size), transmit power may be reduced, Rank 1 transmission may be used, and half duplex operation may be performed.

In some cases, if half-duplex operation is performed, narrowband UEs may have a relaxed switching time to transition from transmitting to receiving (or receiving to transmitting). For example, the switching time may be relaxed from 20 us for regular UEs to 1ms for narrowband UEs. Release 12 narrowband UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the narrowband UEs may be limited to a particular narrowband assignment (e.g., of no more than six resource blocks (RBs)) within the available system bandwidth. However, the narrowband UEs may be able to re-tune (e.g., operate and/or camp) to different narrowband regions within the available system bandwidth of the LTE system, for example, in order to co-exist within the LTE system.

As another example of coexistence within the LTE system, narrowband UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the narrowband UEs may be able to receive the legacy PBCH with one or more additional repetitions of the PBCH across multiple subframes. As another example, the narrowband UEs may be able to transmit one or more repetitions of PRACH (e.g., with one or more PRACH formats supported) to an eNB in the LTE system. The PRACH may be used to identify the narrowband UE. Also, the number of repeated PRACH attempts may be configured by the eNB.

The narrowband UE may also be a link budget limited device and may operate in different modes of operation (e.g. entailing different amounts of repeated messages transmitted to the narrowband UE) based on its link budget limitation. For example, in some cases, the narrowband UE may operate in a normal coverage mode in which there is little to no repetition (i.e., the amount of repetition needed for the UE to successfully receive a message may be low or repetition may not even be needed). Alternatively, in some cases, the narrowband UE may operate in a coverage enhancement (CE) mode in which there may be high amounts of repetition. For example, for a 328 bit payload, a narrowband UE in CE mode may need 150 or more repetitions of the payload in order to successfully receive the payload.

In some cases, for example, for LTE Rel-13, the narrowband UE may have limited capabilities with respect to its reception of broadcast and unicast transmissions. For example, the maximum transport block (TB) size for a broadcast transmission received by the narrowband UE may be limited to 1000 bits. Additionally, in some cases, the narrowband UE may not be able to receive more than one unicast TB in a subframe. In some cases (e.g., for both the CE mode and normal mode described above), the narrowband UE may not be able to receive more than one broadcast TB in a subframe. Further, in some cases, the narrowband UE may not be able to receive both a unicast TB and a broadcast TB in a subframe.

Narrowband UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-narrowband UEs. For example, as compared to conventional paging messages used in LTE, narrowband UEs may able to monitor and/or receive paging messages that non-narrowband UEs may not able to monitor and/or receive. Similarly, as compared to conventional random access response (RAR) messages used in a conventional random access procedure, narrowband UEs may be able to receive RAR messages that also may not be able to be received by non-narrowband UEs. The new paging and RAR messages associated with narrowband UEs may also be repeated one or more times (e.g., "bundled"). In addition, different numbers of repetitions (e.g., different bundling sizes) for the new messages may be supported.

According to certain aspects, multiple narrowband regions, with each narrowband region spanning a bandwidth that is no greater than a total of 6 RBs, may be supported by narrowband UE and/or narrowband operation. In some cases, each narrowband UE in narrowband operation may operate within one narrowband region (e.g., at 1.4 MHz or 6 RBs) at a time. However, narrowband UEs in narrowband operation, at any given time, may re-tune to other narrowband regions in the wider system bandwidth. In some examples, multiple narrowband UEs may be served by the same narrowband region. In other examples, multiple narrowband UEs may be served by different narrowband regions (e.g., with each narrowband region spanning 6 RBs). In yet other examples, different combinations of narrowband UEs may be served by one or more same narrowband regions and/or one or more different narrowband regions.

Some systems, for example, in LTE Rel-13, introduce coverage enhancements and support for narrowband UEs, as well as other UEs. As used herein, the term coverage enhancement generally refers to any type of mechanism that extends the coverage range of a device (such as a narrowband device) within a network. One approach for coverage enhancement (CE) is bundling which refers to transmitting the same data multiple times (e.g., across multiple subframes or, as will be described in greater detail below, across multiple symbols within a same subframe).

In certain systems, narrowband UEs may support narrowband operation while operating in a wider system bandwidth. For example, a narrowband UE may transmit and receive in a narrowband region of a system bandwidth. As noted above, the narrowband region may span 6 resource blocks (RBs).

Certain systems may provide narrowband UEs with coverage enhancements of up to 15 dB, which maps to 155.7 dB maximum coupling loss between the UE and an eNB. Accordingly, narrowband UEs and eNB may perform measurements at low SNRs (e.g., −15 dB to −20 dB). In some systems, coverage enhancements may include channel bundling, wherein messages associated with narrowband UEs may be repeated (e.g., bundled) one or more times.

Certain devices may be able to communicate both with legacy type communications and non-legacy type communications. For example, some devices may be able to communicating in both narrowband regions (of overall system bandwidth) as well as wider band regions. While the examples above refer to low cost or MTC devices that communicate via narrowband regions, other (non low cost/ non-MTC) types of devices may also communicate vie narrowband regions, for example, taking advantage of frequency selectivity and directional transmissions.

In some cases, some UEs (e.g., machine type communication (MTC) UEs) may have low cost, low bandwidth designs (e.g., operating on a narrower bandwidth than a bandwidth used by UEs with higher capability designs) which need not be backward compatible with GSM or EDGE technologies. However, in some cases, these low cost, low power UEs ("narrowband UEs") may be compatible with wideband UEs, using a same or similar design for in-band deployment (i.e., narrowband UEs operating within the bandwidth used by wideband UEs) and standalone deployment (i.e., narrowband UEs operating outside the bandwidth used by wideband UEs).

For some cases of extreme coverage situations, a minimum coupling loss (MCL) of 164 dB may be needed. A design may have high power efficiency, support a large number of devices, and be implemented at a low cost. In some cases, a 200 kHz channel bandwidth may be used for communications by narrowband UEs.

Figure 5:
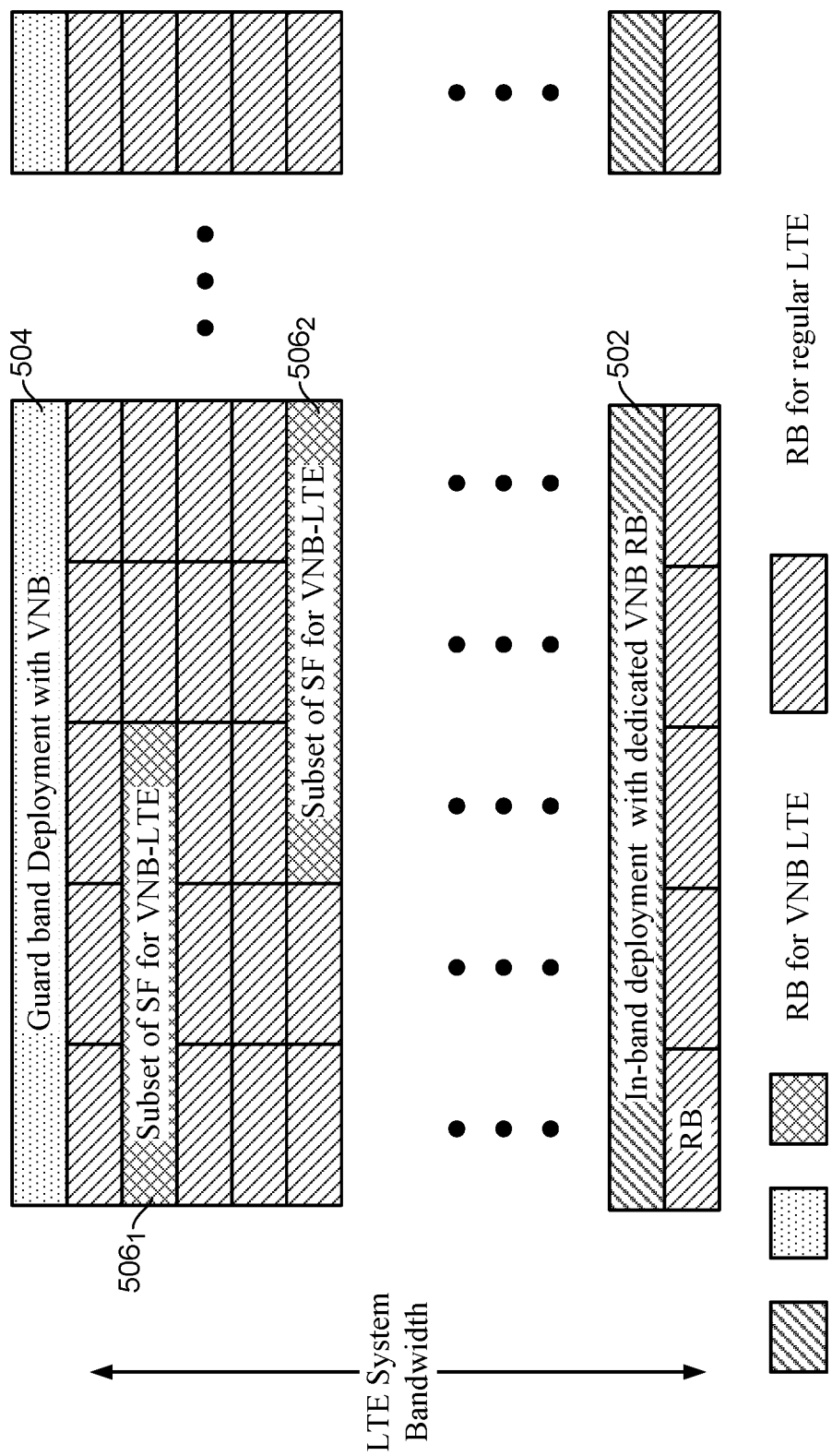
FIG. 5 illustrates examples of narrowband deployments within a larger system bandwidth, in accordance with certain aspects of the present disclosure.

FIG. 5 illustrates a variety of deployments in which a narrowband may be deployed within a larger system bandwidth. As illustrated, a narrowband may be a single LTE resource block with a bandwidth of 180 kHz and a 20 kHz guard band. By using a single LTE resource block for narrowband communications, higher layers of the LTE stack and most of the hardware may be reused. Additionally, narrowband UEs may implement enhanced machine type communications (eMTC) and narrowband LTE, which may avoid fragmentation. As illustrated, these narrowbands may overlap, at least in part, with the system bandwidth (e.g., used by a wideband UE) or may exist outside of the system bandwidth.

In one case, as illustrated by deployment 502, the narrowband may be deployed within the system bandwidth (e.g., inside the system bandwidth used by a wideband UE) and dedicated for use by narrowband UEs. Resource blocks in a wideband channel may be used for narrowband communications. In another case, as illustrated by deployment 504, the narrowband may be deployed within a guard band outside (or between) different channels. In still another case, though not illustrated, a narrowband channel may be a standalone channel. For example, a narrowband channel used for communications by narrowband UEs may be deployed in GSM spectrum and may use a single 200 kHz carrier. As illustrated, in some cases, certain subsets of subframes 506 may be allocated for narrowband transmissions. The subsets of subframes 506 used for narrowband transmissions may be distributed through the system bandwidth. In some cases, as illustrated, a first subset of subframes $506_1$ may partially overlap with other subsets of subframes 506 (e.g., a second subset of subframes $506_2$).

In communications between a UE and an eNodeB (eNB), a UE typically performs a transmission on a physical random access channel (PRACH). The eNB detects the PRACH transmission and sends a timing advance command, and a UE transmits information over a physical uplink shared channel (PUSCH), which may have a minimum allocation of 1 resource block (RB).

In some aspects, a narrowband UE may perform PRACH transmissions using 1RB, which may decrease the timing resolution relative to PRACH transmission sent using a wider bandwidth. The timing resolution for a wider bandwidth of 6 RBs may be roughly 1 microsecond, while the timing resolution for a narrow band of 1 RB may be roughly 5 microseconds. The timing advance command may lose accuracy due to the reduced timing resolution of a 1RB narrow band and potentially a lower signal to noise ratio. In some cases, UEs in deep coverage may be power limited (i.e., may not benefit from additional bandwidth), which may allow the use of sub-RB assignments to increase multiplexing capabilities of narrowband communications (e.g., 1 RB bandwidth LTE communications).

In one design, the uplink numerology of a wideband LTE subframe may be multiplied by a factor of 6 for narrowband LTE communications. Each symbol and cyclic prefix may be six times longer, with a subcarrier spacing of 2.5 kHz. Multiplying the uplink numerology may allow time inaccuracy to be higher without losing efficiency in terms of overhead, and may allow for a large number of UEs to be multiplexed simultaneously. However, multiplying the uplink numerology by a factor of 6 may cause narrowband LTE transmissions to lose orthogonality with wideband (legacy) LTE transmissions, which may result in additional interference. If wideband UEs and narrowband UEs are time-multiplexed in the same RB, the additional cyclic prefix length may not be able to compensate for timing advance errors. Finally, differences between the scheduling time unit for narrowband UEs and wideband UEs may impose issues with scheduling, time-domain duplexed operations, and multiplexing narrowband LTE PUSCH with wideband sounding reference signals.

In some cases, narrowband LTE transmission and wideband LTE transmissions may use the same subframe structure and numerology.

Example D2D Communication for eMTC Design Considerations

Aspects of the present disclosure provide various techniques for improving communication for machine type communication (MTC) devices capable of communicating with a network directly (e.g., via a base station) or indirectly (e.g., via an intermediate device using device-to-device (D2D) communication). More specifically, aspects of the present disclosure provide techniques to improve low-power discovery, transitioning between direct and relay link communication, and paging of MTC devices.

FIG. 6 illustrates an example wireless communication environment in which aspects of the present disclosure may be performed. As illustrated, the wireless communication environment may comprise multiple communication tiers (e.g., a 1st tier and a 2nd tier). As an example, the first communication tier may comprise low power devices, such as a remote radio head (RRH), a small cell, a smart phone, an MTC hub, and, in some cases, MTC devices that communicate with the network (e.g., via macrocell) directly. A second communication tier may comprise MTC devices that may communicate with the network via an intermediate device (e.g., a 1st tier device), for example using D2D and/or WAN.

As noted, there may be different ways an MTC device may communicate with the network (e.g., directly or indirectly). In one example, the MTC device may operate under a relay/D2D mode. For example, upon detection of an intermediate device that is offering/able to provide services to the MTC device, the MTC device may connect to the network through the intermediate device. In some cases, communicating with the network through an intermediate device may help conserve power on the MTC device, thereby extending the battery life of the MTC device.

In this case (i.e., under a relay/D2D mode), however, there may be two entities with different subscriber identity module (SIM) cards. Thus, in this case, there may be an issue regarding how to handle the continuity of connection between the MTC device and the network, as explained in more detail below.

Additionally, the MTC device may communicate with the network through a HUB device via a different type of radio technology. For example, in some cases, the MTC device may establish a Bluetooth® or WiFi connection with the intermediate device and may then communicate with the network through the intermediate device.

In some cases, however, when an intermediate device that is capable of offering services to the MTC device is not within the MTC device's proximity, the MTC device may connect directly with the network, for example, via a base station such as an evolved Node B (eNB).

Certain issues exist, however, with MTC devices that are capable of communicating with the network through an intermediate device and/or with the network directly. For example, issues exist on how MTC devices should perform low power discovery, how to transition between direct communication with the network and communication through an intermediate device, and how to handle paging. Accordingly, aspects of the present disclosure provide techniques to address these issues.

In order to begin communication with the network, an MTC device may need to perform a discovery procedure to determine if any nearby devices (e.g., intermediate devices) exist through which to communicate. The MTC device may then determine whether to communicate with the network directly or using an intermediate device to communicate indirectly with the network.

Figure 7:
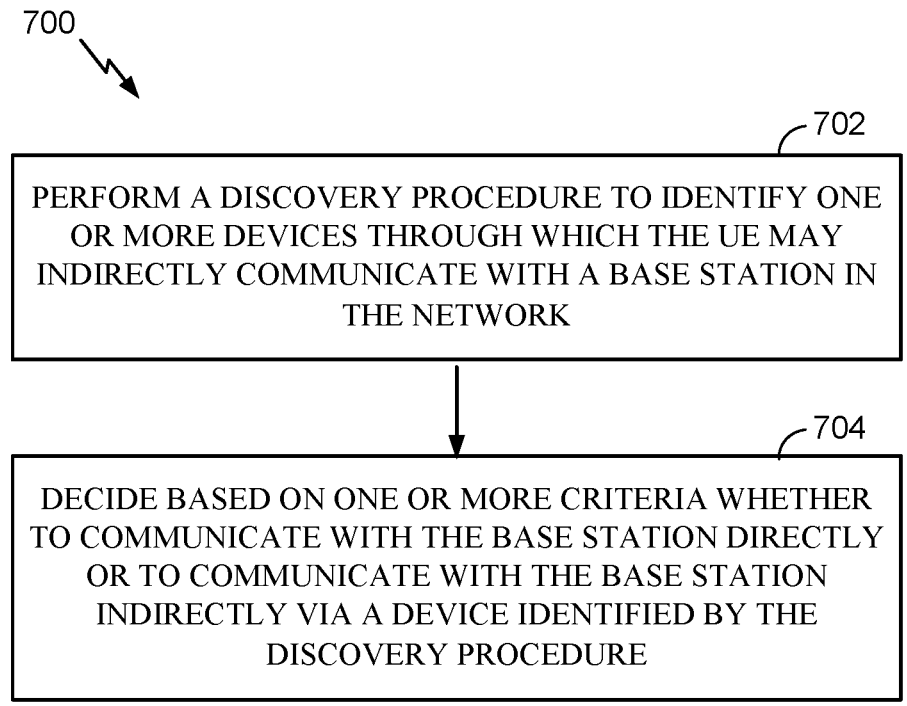
FIG. 7 illustrates example operations by a user equipment (UE), in accordance with certain aspects of the present disclosure.

FIG. 7 illustrates example operations 700 for wireless communication. According to certain aspects, example operations 700 may be performed by a user equipment (UE) of a first type capable of communicating with a network via at least one narrowband region of larger system bandwidth (e.g., an MTC device).

Operations 700 begin at 702 by performing a discovery procedure to identify one or more devices through which the UE may indirectly communicate with a base station in the network. At 704, the UE decides based on one or more criteria whether to communicate with the base station directly or to communicate with the base station indirectly via a device identified by the discovery procedure.

According to certain aspects, for direct communication with the network, an MTC device may perform a search for a primary synchronization signal (PSS), a secondary synchronization signal (SSS), and/or a physical broadcast channel from surrounding eNBs. For communication with the network through an intermediate device, the MTC device may search for a discovery signal from surrounding devices. If the MTC device decides to initiate a connection, for direct communication with the network, the MTC device may perform a radio access channel (RACH) procedure, and for communication through an intermediate device, the MTC device may perform a D2D communications setup.

According to certain aspects, for MTC devices that are in the coverage area of an eNB and are able to receive service from that eNB, as noted above, the MTC device may perform a RACH procedure and a radio resource control (RRC) connection setup with the eNB. Alternatively, the MTC device may connect through a HUB device (e.g., via D2D communication) and indicate that the MTC device is in-band.

For MTC devices that are out of coverage (e.g., not able to receive service directly from an eNB), MTC devices may connect with an intermediate device, instead of performing the RACH procedure. According to certain aspects, during D2D connection setup, the MTC device may indicate (e.g., to the intermediate device) that it is not associated with any eNB. For initial connection, the MTC device may search for predefined discovery signals from intermediate devices. Once the MTC device establishes a connection with an intermediate device, the intermediate device may relay connection setup information for the MTC device to the network.

In order to establish a connection with an intermediate device, as noted above, the MTC device may need to perform a close-range, low-power discovery procedure to discover intermediate devices that the MTC device is able to connect to. This discovery procedure may involve searching for discovery signals transmitted by nearby devices (e.g., eNBs and or intermediate devices).

Figure 8:
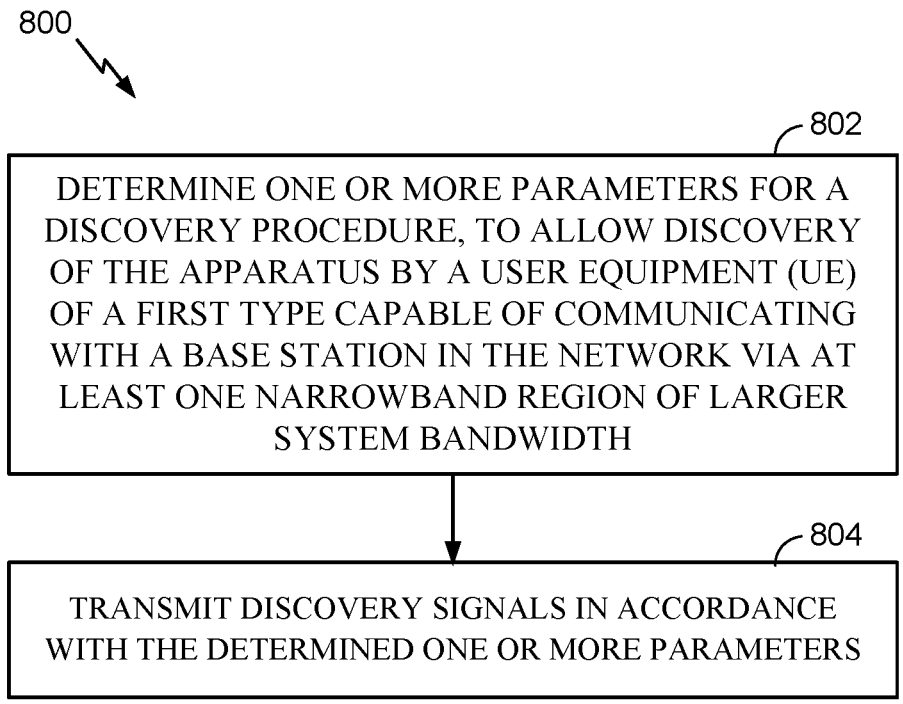
FIG. 8 illustrates example operations by an apparatus, in accordance with certain aspects of the present disclosure

FIG. 8 illustrates example operations 800 for wireless communication in a network. According to certain aspects, operations 800 may be performed by an apparatus (e.g., an intermediate apparatus), for example, for transmitting discovery signals.

Operations 800 begin at 802 by determining one or more parameters for a discovery procedure, to allow discovery of the apparatus by a user equipment (UE) of a first type capable of communicating with a base station in the network via at least one narrowband region of larger system bandwidth. At 804, the apparatus transmits discovery signals in accordance with the determined one or more parameters.

According to certain aspects, there may be a specific connection setup (e.g., using specific D2D connection parameters) between the intermediate device and the MTC device. For example, after initial setup, the MTC device may always search only particular signature sequence(s) associated with an intermediate device. In some cases, the initial connection may be performed through the network. For example, the MTC device may connect to an eNB and the eNB may supply the MTC device with D2D configuration information (e.g., parameters) for establishing a connection between the MTC device and the intermediate device. Additionally, transmissions between the intermediate device and the MTC device may have a fixed periodicity, which may be pre-negotiated and that target latency and/or power requirements of the MTC/intermediate device(s). In other words, parameters such as transmission periodicity, target latency, and/or power requirements may be pre-negotiated and used when communicating between the MTC device and an intermediate device.

According to certain aspects, transmission of discovery signals used to establish a connection between an intermediate device and an MTC device may be performed differently depending on a coverage condition. For example, if the MTC device is in coverage of an eNB, the intermediate device may transmit a discovery signal periodically and the MTC device may perform a search for the discovery signals. According to certain aspects, this option may support multiple MTC devices. If the MTC device is out of coverage, the MTC device may transmit a signature sequence. In this case, the intermediate device may have to perform a search for these signature sequences on a regular basis.

According to certain aspects, when a device is acting as an intermediate between the network and an MTC device, two communication links may exist. For example, a first link may comprise the link between the intermediate device and an eNB and may involve regular LTE type communications. A second link may comprise a D2D link/communications between the intermediate device and the MTC device (e.g., in some cases Bluetooth® and/or WiFi).

Certain design options exists between these two links. For example, the first link and the second link may be kept independent. Under this design, acknowledgements (ACKs)/negative acknowledgements (NACKs) may only concern the link quality on the first link. According to certain aspects, this design may be equivalent to "layer 2" (or higher) relaying. In another design, the first and second links may be joint, where ACKs/NACKs concern the success between the MTC device and the eNB. According to certain aspects, this design may be equivalent to "layer 1" relaying.

According to certain aspects, as noted above, an MTC device may need to decide whether to transmit its traffic directly to the network (e.g., via an eNB) or through an intermediate device (e.g., using D2D communication). As part of this determination, the MTC device may take into account the qualities of the communication link between the MTC device and an eNB and the quality of the communication link between the intermediate device and the eNB. For example, the MTC device may measure the quality of the link between the intermediate device and itself and the quality of the link between itself and the eNB.

According to certain aspects, the MTC device may determine to connect to and/or camp on an eNB or intermediate device based also on the quality of the communication link between the intermediate device and the eNB. However, the MTC device is not able to measure this quality and thus must receive the quality information from either the intermediate device or the network. For example, according to certain aspects, the intermediate device may broadcast the quality information (i.e., the quality of the signal between the HUB device and the eNB) in the D2D discovery channel (e.g., within discovery signals). The MTC device may receive the quality information and may make a determination of whether to connect to and/or camp on the eNB or the intermediate device, for example, based on which signal (i.e., the signal between the MTC device and the eNB or the signal between the HUB device and the eNB) is better. For example, if the signal between the MTC device and the eNB is better, the MTC device may decide to connect directly to the network via the eNB, whereas if the signal between the intermediate device and the eNB is better, the MTC device may choose to connect to the network via the intermediate device.

Additionally, the intermediate device may also broadcast the resources available for D2D communication (e.g., also within discovery signals), and depending on these resources, the MTC device may decide whether to connect to and/or camp on the eNB or intermediate device. For example, if the D2D communication offers lower data rate than the one needed by the MTC device, the MTC device may decide to connect to the eNB instead of communicating through the intermediate device.

Additionally or alternatively, when the signal between an intermediate device and an eNB falls below a certain threshold, the intermediate device (e.g., a HUB) may decide to turn off a D2D connection between it and the MTC device so that the MTC device only "sees" the eNB. In this case, assuming no other intermediate devices are in proximity to the MTC device, the MTC device may connect directly to the network via an eNB. However, if other intermediate device(s) exist within the proximity of the MTC device, the MTC device may choose to connect with the other intermediate device(s) for communication with the network.

According to certain aspects, the previous solutions regarding determining whether to transmit directly to an eNB or to transmit via an intermediate device may work independently of the radio access technology (RAT) used for D2D connection (e.g. LTE-Direct, WiFi, Bluetooth®, etc.).

According to certain aspect, when connected to an intermediate device, the MTC device should not declare a radio link failure (RLF) so long as the MTC device can find a nearby D2D device (e.g., another intermediate device) that can be linked to the network. If other intermediate devices exist near the MTC device, the MTC device may be handed over from one intermediate device to another intermediate device so as to maintain the connection to the network.

As noted above, there may be issues that exist with how to perform paging for MTC devices which are, for example, connected to the network through an intermediate device. For example, the network may want to page an MTC device in an idle state, but the MTC device might want to connect to the network through the intermediate device. So, an issue may exist for how the network should page the MTC device.

Figure 9:
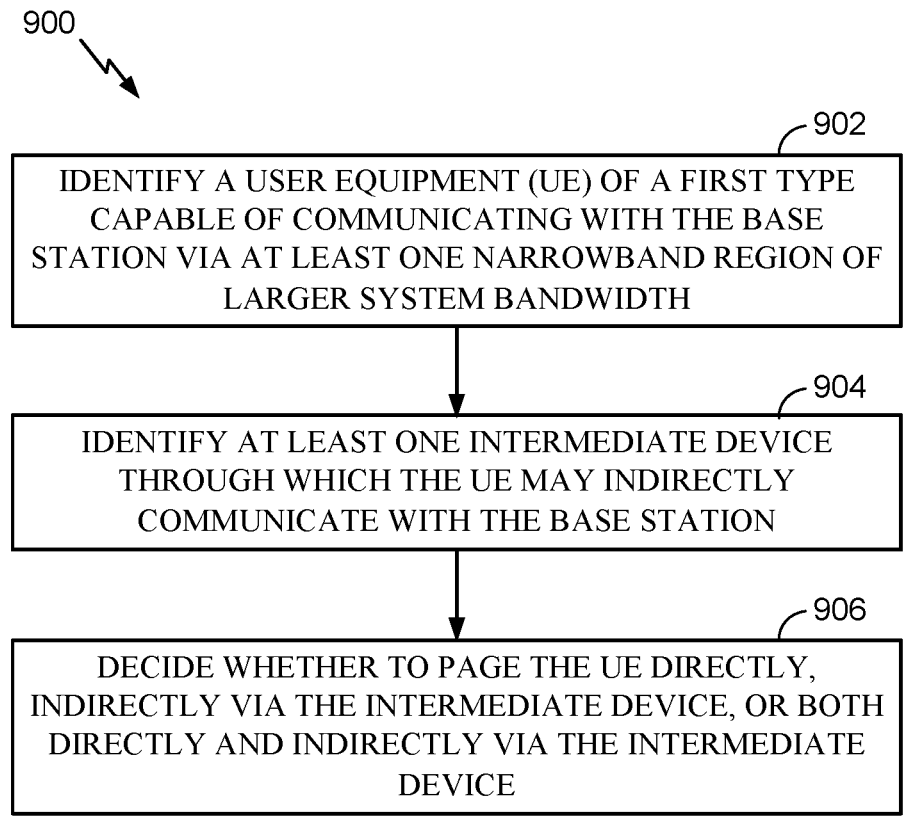
FIG. 9 illustrates example operations by a base station (BS), in accordance with certain aspects of the present disclosure

FIG. 9 illustrates example operations 900 for wireless communication which may help alleviate the above identified paging issues for MTC devices. According to certain aspects, operations 900 may be performed, for example, by a base station.

Operations 900 begin at 902 by identifying a user equipment (UE) of a first type capable of communicating with the base station via at least one narrowband region of larger system bandwidth. At 904, the base station identifies at least one intermediate device through which the UE may indirectly communicate with the base station. At 906, the base station decides whether to page the UE directly, indirectly via the intermediate device, or both directly and indirectly via the intermediate device.

According to certain aspects, to help alleviate paging issues, one solution may involve the MTC device selecting two devices for communication with the network: the best eNB for LTE communication and the best intermediate device for D2D communication. The MTC device may then receive a page from the eNB and may connect to the network through the intermediate device.

According to certain aspects, in another solution, if the MTC device is camping on an intermediate device, the MTC device may notify the network of the intermediate device that the MTC device is camping on. The eNB may then transmit a page to the intermediate device which then forwards the page to the MTC device. In some cases, however, there may be more than one intermediate device that could forward a page to the MTC device. In this case, paging may be different from each intermediate device, and the MTC device may connect to the intermediate device from which it receives paging. Additionally or alternatively, the MTC device may receive a single frequency network (SFN) page (e.g. a page that is simultaneously transmitted from all intermediate devices) and may connect to the intermediate device that has the best signal quality (e.g., between the MTC device and the intermediate device and/or the intermediate device and the eNB).

In some cases, a user may possess a MTC device and an intermediate device (e.g., a smart phone) that both have the same number but a different UE ID (as these two devices may have different SIM cards). A network, however, may not know if the user is carrying both the MTC device and/or the intermediate device, so the network may not know which device to page and setup the call with. According to certain aspects, the network may page both the MTC device and the intermediate device simultaneously, forcing both devices to simultaneously ring. Once the user answers one of the calls on either the MTC device or the intermediate device, the call on the other device is automatically dropped. In some cases, the network may page the intermediate device first, and if the user does not answer the intermediate device, the network may then page the MTC device. In other cases, the network may be provided with information (e.g., by the intermediate device and/or the MTC device) as to whether a user possesses both the MTC device and the intermediate device. In this case, the network may decide to page either the intermediate device or the MTC device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for performing, means for deciding, means deciding, means for searching, means for negotiating, means for changing (e.g., communication), means for altering (e.g., radio link monitoring), means for monitoring, means for taking action, means for establishing, means for determining, means for serving, means for identifying, means for maintaining, means for paging, means for releasing, and/or means for measuring may comprise a processing system, which may include one or more processors, such as the controller/processor 280 of the user equipment 120, and/or the controller/processor 240 of the eNodeB 110 illustrated in FIG. 2. Additionally, means for transmitting, means for receiving, means for providing, and/or means for communicating may comprise one or more antennas, such as the antennas 234 of the eNodeB 110 and or antennas 252 of the user equipment 120.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE) in a network, comprising:
 performing a discovery procedure to identify one or more intermediate devices through which the UE may indirectly communicate with a base station in the network;
 receiving information, from an intermediate device identified by the discovery procedure that includes at least a signal strength between the intermediate device and the base station, wherein the information is received in a discovery signal from the intermediate device; and
 deciding, based on one or more criteria, whether to communicate with the base station directly via at least one narrowband region of a larger system bandwidth or to communicate with the network indirectly via the intermediate device, wherein the one or more criteria comprises:
 a criterion that involves the signal strength between the intermediate device and the base station, and
 a criterion that involves resources available at the intermediate device for device to device (D2D) communication, the resources available at the intermediate device comprising at least a data rate available for the D2D communication, and wherein the received information further includes an indication of the resources available at the intermediate device for D2D communication.

2. The method of claim 1, wherein the one or more criteria further comprises at least one of:
 whether or not the discovery procedure identifies an intermediate device in proximity to the UE;
 a criterion that involves a signal strength between the UE and the base station; or
 a criterion that involves a signal strength between the UE and an intermediate device.

3. The method of claim 1, wherein the one or more intermediate devices comprise at least one of: a phone, a low power base station, a remote radio head, or a hub device that also communicates with the base station via at least one narrowband region of larger system bandwidth.

4. The method of claim 1, wherein the discovery procedure involves at least one of:
 searching for synchronization signals from one or more cells;
 searching for discovery signals from one or more intermediate devices; or
 searching for predefined discovery signals from one or more intermediate devices.

5. The method of claim 1, further comprising negotiating one or more parameters for performing the discovery procedure.

6. The method of claim 1, further comprising performing a device to device (D2D) connection setup with an intermediate device if it is decided to communicate with the base station indirectly via an intermediate device.

7. The method of claim 1, further comprising performing a random access channel (RACH) procedure if deciding to communicate with the base station directly.

8. The method of claim 1, wherein how the discovery procedure is performed depends on whether or not the UE is in coverage of the base station.

9. The method of claim 1, further comprising changing from communicating directly with a base station of the network to communicating indirectly with the network via an intermediate device.

10. The method of claim 9, wherein the change is prompted by at least one of:
 a measured link quality between the UE and the intermediate device;
 a measured link quality between the UE and the base station; or
 a measured link quality between the intermediate device and the base station.

11. The method of claim 1, wherein the discovery is not performed if a link quality between the intermediate device and the base station is below a threshold level.

12. The method of claim 1, further comprising altering radio link monitoring procedures based on results of the discovery procedure, wherein the altering of the radio link monitoring comprises declaring a radio link failure depending on the results of the discovery procedure.

13. The method of claim 1, further comprising taking action to hand the UE over between intermediate devices identified during the discovery procedure.

14. The method of claim 1, further comprising receiving a page from the network, wherein the page is received via the intermediate device or directly from the base station.

15. The method of claim 14, further comprising, in response to the page received directly from the base station, establishing connection with the intermediate device.

16. A method for wireless communications by an apparatus in a network, comprising:
 determining one or more parameters for a discovery procedure, to allow discovery of the apparatus by a user equipment (UE) of a first type capable of communicating with a base station in the network via at least one narrowband region of a larger system bandwidth;
 measuring an indicator of signal quality from the apparatus to the base station while refraining from transmitting the discovery signals; and
 transmitting discovery signals in accordance with the determined one or more parameters, wherein transmitting the discovery signals comprises transmitting the indicator of signal quality in at least one of the discovery signals, wherein transmitting the discovery signals further comprises transmitting an indication of resources available at the apparatus for device to device (D2D) communication, the resources available at the apparatus comprising at least a data rate available for the D2D communication.

17. The method of claim 16, wherein the determining comprises negotiating with the UE.

18. The method of claim 16, wherein the one or more parameters comprise at least one of a predetermined discovery sequence or timing of discovery signal transmission.

19. The method of claim 16, further comprising:
 establishing connection with the UE; and
 serving as an intermediate device, allowing the UE to communicate indirectly with the base station via the apparatus.

20. An apparatus for wireless communications by a user equipment (UE), comprising:
 at least one processor configured to:
  perform a discovery procedure to identify one or more intermediate devices through which the UE may indirectly communicate with a base station of the network;
  receive information, from an intermediate device identified by the discovery procedure, that includes at least a signal strength between the intermediate device and the base station, wherein the information is received in a discovery signal from the intermediate device; and
  decide, based on one or more criteria, whether to communicate with the base station directly via at least one narrowband region of a larger system bandwidth or to communicate with the network indirectly via the intermediate device,
 wherein the one or more criteria comprises:
  a criterion that involves the signal strength between the intermediate device and the base station, and
  a criterion that involves resources available at the intermediate device for device to device (D2D) communication, the resources available at the intermediate device comprising at least a data rate available for the D2D communication, and wherein the received information further includes an indication of the resources available at the intermediate device for D2D communication; and a memory coupled with the at least one processor.

21. The apparatus of claim 20, wherein the one or more criteria further comprise at least one of:

whether or not the discovery procedure identifies an intermediate device in proximity to the UE;

a criterion that involves a signal strength between the UE and the base station; or a criterion that involves a signal strength between the UE and an intermediate device.

22. The apparatus of claim 20, wherein the at least one processor is further configured to perform a device to device (D2D) connection setup with an intermediate device if it is decided to communicate with the base station indirectly via an intermediate device.

23. The apparatus of claim 20, wherein the at least one processor is further configured to change from communicating directly with a base station of the network to communicating indirectly with the network via an intermediate device.

24. The apparatus of claim 23, wherein the change is prompted by at least one of:

a measured link quality between the UE and the intermediate device;

a measured link quality between the UE and the base station; or a measured link quality between the intermediate device and the base station.

25. An apparatus for wireless communications, comprising:

at least one processor configured to:

determining one or more parameters for a discovery procedure, to allow discovery of the apparatus by a user equipment (UE) of a first type capable of communicating with a base station network via at least one narrowband region of a larger system bandwidth;

measure an indicator of signal quality from the apparatus to the base station while refraining from transmitting the discovery signals; and transmit discovery signals in accordance with the determined one or more parameters, wherein to transmit the discovery signals the at least one processor is configured to transmit the indicator of signal quality in at least one of the discovery signals and to transmit an indication of resources available at the apparatus for device to device (D2D) communication, the resources available at the apparatus comprising at least a data rate available for the D2D communication; and a memory coupled with the at least one processor.

26. The apparatus of claim 25, wherein the one or more parameters comprise at least one of a predetermined discovery sequence or timing of discovery signal transmission.

27. The apparatus of claim 25, wherein the at least one processor is further configured to:

establish a connection with the UE; and serve as an intermediate device, allowing the UE to communicate indirectly with the base station via the apparatus.

* * * * *